United States Patent

Blum et al.

Patent Number: 5,332,799
Date of Patent: * Jul. 26, 1994

[54] SOLUTIONS OF POLYIMIDE-FORMING STARTING MATERIALS

[75] Inventors: Rainer Blum, Ludwigshafen; Hans J. Heller; Klaus Lienert, both of Hamburg, all of Fed. Rep. of Germany

[73] Assignee: BASF Lacke+Farben Aktiengesellschaft, Muenster, Fed. Rep. of Germany

[ * ] Notice: The portion of the term of this patent subsequent to Nov. 23, 2010 has been disclaimed.

[21] Appl. No.: 970,391

[22] Filed: Nov. 2, 1992

[51] Int. Cl.$^5$ .................... C08G 69/26; C08G 73/10
[52] U.S. Cl. .................... 528/353; 528/125; 528/126; 528/128; 528/170; 528/172; 528/173; 528/176; 528/185; 528/188; 528/220; 528/226; 528/229; 528/350; 524/379; 524/391; 524/600; 524/606; 524/607
[58] Field of Search .............. 528/353, 350, 125, 126, 528/128, 170, 172, 173, 176, 188, 185, 220, 226, 229; 524/600, 379, 391, 606, 607

[56] References Cited

U.S. PATENT DOCUMENTS 3,347,808 10/1967 Lavin et al. .
3,502,712 3/1970 DeBrunner .
3,542,703 11/1970 DeBrunner .
3,700,649 10/1972 Boram et al. .
4,533,574 8/1985 Fryd et al. .
4,874,835 10/1989 Berdahl .
4,960,824 10/1990 Olson et al. .

FOREIGN PATENT DOCUMENTS 0274121 7/1988 European Pat. Off. .
1937388 1/1970 Fed. Rep. of Germany .

OTHER PUBLICATIONS

CA 115(12): 115339c, Blum et al, Sep. 23, 1991.

Primary Examiner—John Kight, III
Assistant Examiner—P. Hampton-Hightower
Attorney, Agent, or Firm—Oblon, Spivak, McClelland, Maier & Neustadt

[57] ABSTRACT

In solutions of polyimide-forming starting materials, containing diamines and tetracarboxylic diesters, at least 2 mol % of the ester groups in the tetracarboxylic diesters are derived from alcohols of the general formula $$HO-Z-O-X \qquad \text{I}$$

or $$HO-Z-X \qquad \text{II}$$

where Z is a straight-chain or branched aliphatic radical of from 1 to 15 carbon atoms which can be interrupted by from 1 to 4 ether groups —O— and X is an aromatic radical of from 5 to 20 carbon atoms which can also contain nitrogen, oxygen or sulfur as hetero atoms in the aromatic ring system, excepting benzyl alcohol as compound of the formula II in the case of the use of diamines having a basicity constant of less than or equal to $10^{-11}$.

10 Claims, No Drawings

SOLUTIONS OF POLYIMIDE-FORMING STARTING MATERIALS

The present invention concerns solutions of polyimide-forming starting materials, containing diamines and tetracarboxylic diesters, wherein at least 2 mol % of the ester groups in the tetracarboxylic diesters are derived from alcohols of the general formula

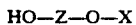

HO—Z—O—X    I or

HO—Z—X    II

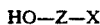

where Z is a straight-chain or branched aliphatic radical of from 1 to 15 carbon atoms which can be interrupted by from 1 to 4 ether groups —O— and X is an aromatic radical of from 5 to 20 carbon atoms which can also contain nitrogen, oxygen or sulfur as hetero atoms in the aromatic ring system, excepting benzyl alcohol as compound of the formula II in the case of the use of diamines having a basicity constant of less than or equal to $10^{-11}$.

The present invention further relates to the use of these solutions for preparing coatings.

Polyimides are increasingly used for coating metal wires, glass and quartz fibers, and substrates made of silicon (silicon wafers). More particularly, they are used in electronics and microelectronics, for example as intermediate or top layers in the building up of circuits.

In general this involves coating the substrates with solutions of polyimides or polyamidic acids, and in the case of the polyamidic acid the imidation then takes place on the substrate surface.

The solutions of polyimides and polyamidic acids, however, need to be relatively low in concentration in order that a sufficiently low processing viscosity may be obtained. Typical commercial products generally have a solids content of only from 12 to 20% by weight.

The result of the low concentration is a high degree of shrinkage in the course of drying. This shrinkage results in a more or less pronounced copying of the structure underneath the polyimide layer into the polyimide surface.

Especially in the case of multilayer coatings, necessary for example for circuits, this produces inaccuracies in the buildup.

For this reason and to avoid excessively large solvent quantities it would be desirable to have more concentrated solutions. Higher concentrations are possible in principle with solutions which contain only the starting materials for the polyimides. However, since solutions of tetracarboxylic dianhydrides and diamines are not storage stable and polymerize with tithe, tetracarboxylic diesters are used instead of the tetracarboxylic dianhydrides.

U.S. Pat. No. 3,502,712 and U.S. Pat. No. 3,542,703 disclose using solutions of diamines and tetracarboxylic diesters, the esters being derived from alkanols or phenol, for preparing polyimide foams.

U.S. Pat. No. 3,700,649 describes solutions of benzophenonetetracarboxylic diesters and diamines with a very low basicity for preparing polyimide coatings. The alcohols mentioned for the esterification are alkanols and benzyl alcohol.

In U.S. Pat. No. 3,347,808 the solutions of tetracarboxylic diesters and diamines have only alkanols as esterifying component.

U.S. Pat. No. 4,874,835 concerns solutions of diamines and diesters of oxydiphthalic acid with alkanols.

U.S. Pat. No. 4,960,824 discloses solutions of diesters of araliphatic tetracarboxylic acids with alkanols and at least one diamine selected from m-phenylenediamine, p-phenylenediamine or 4-aminophenyl ether.

However, polyimide coatings prepared from solutions of the starting materials still have many disadvantages, such as blistering and inadequate planarity of the coatings.

It is an object of the present invention to eliminate these disadvantages.

We have found that this object is achieved by the solutions defined at the beginning and by their use for preparing polyimide coatings.

The solutions according to the invention contain tetracarboxylic diesters and diamines as starting materials for polyimides.

Suitable tetracarboxylic diesters are in particular those which are derived from aromatic or partly aromatic tetracarboxylic dianhydrides which contain at least one aromatic ring. These tetracarboxylic diesters can be tetracarboxylic diesters with one aromatic ring, with fused aromatic ring systems or aromatic rings which are joined together for example by a single bond, an ether, carbonyl or sulfonyl group or aliphatic hydrocarbon radicals, in particular of from 1 to 8 carbon atoms and with or without hetero atoms such as oxygen, sulfur or nitrogen. The aromatic rings or ring systems may carry as substituents in particular $C_1$-$C_6$-alkyl or -alkoxy groups or halogen atoms such as chlorine or fluorine.

Examples are the following tetracarboxylic dianhydrides from which the tetracarboxylic diesters are derived:

2,3,9,10-perylenetetracarboxylic dianhydride, 1,4,5,8-naphthalenetetracarboxylic dianhydride, 2,6-dichloronaphthalene-1,4,5,8-tetracarboxylic dianhydride, 2,7-dichloronaphthalene-1,4,5,8-tetracarboxylic dianhydride, phenanthrene-1,8,9,10-tetracarboxylic dianhydride, pyromellitic dianhydride, 3,3',4,4'-biphenyltetracarboxylic dianhydride, 2,2',3,3'-biphenyltetracarboxylic dianhydride, 4,4'-isopropylidenediphthalic dianhydride, hexafluoroisopropylidene-2,2-bisphthalic anhydride, 3,3'-isopropylidenediphthalic dianhydride, 4,4'-oxydiphthalic dianhydride, 4,4'-sulfonyldiphthalic dianhydride, 3,3'-oxydiphthalic dianhydride, 4,4'-methylenediphthalic dianhydride, 4,4'-thiodiphthalic dianhydride, 4,4'-acetylidenediphthalic dianhydride, 2,3,6,7-naphthalenetetracarboxylic dianhydride, 1,2,4,5-naphthalenetetracarboxylic dianhydride, 1,2,5,6-naphthalenetetracarboxylic dianhydride, benzene-1,2,3,4-tetracarboxylic dianhydride, thiophene-2,3,4,5-tetracarboxylic dianhydride, 1-(3',4'-dicarboxyphenyl)-1,3,3-trimethylindan-5,6-dicarboxylic dianhydride, 1-(3',4'-dicarboxyphenyl)-1,3,3-trimethylindan-6,7-dicarboxylic dianhydride, 1-(3',4'-dicarboxyphenyl)-3-methylindan-5,6-dicarboxylic dianhydride, 1-(3',4'-dicarboxyphenyl)-3-methylindan-6,7-dicarboxylic dianhydride, 3,3',4,4'-benzophenonetetracarboxylic dianhydride, 4,5,3',4'-benzophenonetetracarboxylic dianhydride and 2,2'-bis[4-(3,4-dicarboxyphenoxy)phenyl]propane dianhydride.

It is also possible to use in particular mixtures of tetracarboxylic diesters. Mixtures of tetracarboxylic diesters derived from oxydiphthalic dianhydrides, benzophenonetetracarboxylic dianhydrides, biphenyltetracarboxylic dianhydrides or hexafluoroisopropylidene-2,2-bisphthalic dianhydride are particularly advantageous.

Preferably, the ester groups in the tetracarboxylic diesters are derived to an extent of at least 2 mol %, based on all the ester groups, from alcohols of the general formula

   I or

   II where Z is a straight-chain or branched aliphatic radical of from 1 to 15, preferably from 1 to 8, carbon atoms which may be interrupted by from 1 to 4, preferably 1-2, ether groups —O— and X is an aromatic radical of from 5 to 20 carbon atoms which may also contain nitrogen, oxygen or sulfur in the aromatic ring system. Very particularly preferably, X is a phenyl ring and Z is a $C_1$-$C_6$-alkylene radical.

As alcohols of the formula I there may be mentioned for example monophenoxyethylene glycol or monophenoxypropylene glycol.

As alcohols of the formula II it is possible to mention for example benzyl alcohol, 1-hydroxy-2-phenylethane and 1-hydroxy-2-phenylpropane.

Benzyl alcohol is excluded if the diamines used are those having a basicity constant of less than or equal to $10^{-11}$.

As further alcohols from which the ester groups in the tetracarboxylic diesters are derived there may be mentioned in particular $C_1$-$C_8$-alkanols.

Furthermore, in minor amounts it is also possible to use polyfunctional alcohols.

Preferably, at least 10, particularly preferably at least 30, mol % of the ester groups in the diesters are derived from alcohols of the general formula I or II.

Very particularly preferably, all the ester groups in the diesters are derived from alcohols of the general formula I or II.

The preparation of the tetracarboxylic diesters can be effected in a simple way by esterifying the tetracarboxylic dianhydrides with the abovementioned alcohols in a conventional manner. In the course of the esterification the anhydride rings are split, and one anhydride ring gives rise to an ester group and a carboxylic acid group. Substantially no further esterification of the still remaining carboxylic acid groups takes place, so that tetracarboxylic tetraesters or triesters are available only in minor amounts even if the alcohol is present in a large excess. The esterification is preferably carried out at from 50° to 150° C. If desired, it is also possible to add esterification catalysts, for example dimethylaminopyridine.

The tetracarboxylic diesters can also be prepared by other methods, for example by direct esterification of the tetracarboxylic acids.

Suitable diamines are in particular aromatic or partly aromatic diamines which contain at least one aromatic group. These divines can be diamines with one aromatic ring, with fused aromatic ring systems or aromatic rings which are Joined together for example by a single bond, an ether, carbonyl or sulfonyl group or aliphatic hydrocarbon radicals, in particular of from 1 to 8 carbon atoms and with or without hetero atoms such as sulfur, nitrogen or oxygen. The aromatic rings or ring systems may carry as substituents in particular $C_1$-$C_6$-alkyl or -alkoxygroups or halogen atoms such as chlorine or fluorine.

Examples are benzidine, dimethylbenzidine, dimethoxybenzidine, diethoxybenzidine, diaminodiphenyl sulfone, diaminodiphenylpropane, diaminodiphenyl sulfide, 4,4'-bis[2-(4-aminophenyl)propane]phenylene/bisaniline P, 4,4'-dimethyl-3,3'-diaminodiphenyl sulfone, 4,4'-dimethyl-3,3'-diaminodiphenyl sulfide, p-phenylenediamine, m-phenylenediamine, diethyltoluylenediamine, diaminomethoxybenzene, xyluylenediamine, diaminocumene, diaminonaphthalene, diaminonaphthol, diaminonaphthoquinone, diaminoanthracene, diaminoanthraquinone, diaminophenanthrene, 9,10-bis(4-aminophenyl)anthracene, 3,5-diethyl-2,4-diaminotoluene, 3,5-diethyl-2,6-diaminotoluene, diisopropylphenylenedimine, 4,4'-methylenebis(2,6-diisopropylaniline), 4,4'-methylenebis(2-methyl-6-isopropylaniline), 2,6-diisopropylaniline, 1,3-diamino-4-methoxybenzene, hexafluoro-2,2-bis(3-amino-4,5-dimethylphenyl)propane, 2,2-bis(4,4'-aminophenyl)propane, bis(4,4'-aminophenyl) sulfone, bis(4,4'-aminophenyl) sulfide, bis(3,3'-aminophenyl) sulfone, bis(3,3'-aminophenyl) sulfide, 2,2-bis[4-(4-aminophenoxy)phenyl]propane, 2,2-bis[4-(4-aminophenoxy)phenyl]hexafluoropropane, bis[4-(4-aminophenoxy)phenyl]sulfone, bis[4-(4-aminophenoxy)phenyl]sulfide, 2,2-bis[4-(3-aminophenoxy)phenyl]hexafluoropropane, bis[4-(3-aminophenoxy)phenyl]sulfone, bis-[4-(3-aminophenoxy)phenyl]sulfide, 4,4'-bis(4-aminophenoxy)biphenyl, 4,4'-bis(3-aminophenoxy)biphenyl, 1,4'-bis(4-aminophenoxy)phenylene, 1,3'-bis(4-aminophenoxy)phenylene, diaminodiphenylmethane, diaminodiphenoxyphenyl sulfone, diaminodiphenoxyphenyl sulfide, diaminodiphenyl oxide, diaminopyridine, bis(4-aminophenyl)-dialkylsilane, 3,3'-dihydroxy-4,4'-diaminobiphenyl, 9,9'-bis(4-amino)fluorene, o-toluidine sulfone, diaminobenzanilide, acridinediamine and methylenebisanthranilamide.

It is also possible to use in particular mixtures of diamines.

Suitable solvents for the tetracarboxylic diesters and diamines are for example polar organic solvents, such as aliphatic or aromatic alcohols, ethers, ketones, aldehydes or esters.

Preference is given to highly polar solvents such as N-methylpyrrolidone, formamide, dimethylformamide, alkylalkylenediureas such as dimethylethylenediurea or dimethylpropylenediurea, dimethyl sulfoxide, butyrolactone, pyrrolidone, dialkylacetamide but also glycols, glycol esters and glycol ethers.

As solvent it is obviously also possible to use the alcohol customarily used in excess in the preparation of the tetracarboxylic diesters.

The choice of solvent or solvent mixture depends essentially only on the solubility or polarity of the tetracarboxylic diesters and diamines.

If desired it is also possible to use apolar solvents such as aliphatic or aromatic hydrocarbons in solvent mixtures.

The solutions according to the invention preferably contain the tetracarboxylic diesters and the diamine in a molar ratio of from 1.5:1 to 1:1.5; the molar ratio is particularly preferably about 1:1.

The solids content of the solutions is preferably from 30 to 60% by weight.

To prepare the solutions it is possible to add the tetracarboxylic diester, the diamine and the solvent together in any desired order. For example, it is possible first to prepare the tetracarboxylic diester by reacting a tetracarboxylic dianhydride with an excess of alcohol and to add the diamine with or without further solvent to the resulting mixture. To dissolve all the components the mixture is stirred if necessary at room temperature or else at elevated temperature, for example at from 30° to 120° C., in particular at 40°-80° C.

The solutions of the invention may contain customary additives, such as imide formation catalysts, dyes, pigments, fillers, flow control agents and viscosity regulators.

They are suitable for use as coating compositions for preparing coatings on a wide range of substrates, for example metal, glass or silicon. The hardening of the coating is preferably effected at final temperatures of from 150° to 450° C., particularly preferably at from 300° to 400° C. It is particularly advantageous to carry out the hardening process in multiple stages by raising the temperature stage by stage until the final temperature is obtained.

The solutions of the invention give blister-free planar coatings even in considerable thickness.

EXAMPLES

Abbreviations

ODPA Oxydiphthalic dianhydride
PMDA Pyromellitic dianhydride
BTDA Benzophenonetetracarboxylic dianhydride
BAPP-DA 2,2'-Bis[4-(3,4-dicarboxyphenoxy)phenyl]propane dianhydride
DADO Diaminodiphenyl oxide
BAPP 2,2-Bis[-(4-aminophenoxy)phenyl]propane
m-PDA m-Phenylenediamine
p-PDA p-Phenylenediamine
MEG Monophenoxyethylene glycol
MPG Monophenoxypropylene glycol
BZA Benzyl alcohol
E Ethyl alcohol
M Methanol
S 100 Solvesso® 100 ($C_1$–$C_6$-alkylbenzene mixture from ESSO)
DMAP Dimethylaminopyridine
NMP N-Methylpyrrolidone
DMAC Dimethylacetamide
BLAC Butyrolactone

EXAMPLES 1 TO 8

The tetracarboxylic dianhydride was stirred with an alcohol and a solvent at 110° C. for 30 minutes. After cooling, the diamine and further solvent were added to the resulting tetracarboxylic diester and the mixture was stirred until a solution had formed.
Starting Materials

EXAMPLE 1

31.03 g of ODPA (0.1 mol)
41.45 g of MEG (0.3 mol)
30.00 g of NMP
0.50 g of DMAP
20.01 g of DADO (0.1 mol)
34.86 g of NMP

EXAMPLE 2

32.23 g of BTDA (0.1 mol)
45.66 g of MPG (0.3 mol)
30.00 g of NMP
0.50 g of DMA
20.01 g of DADO (0.1 mol)
37.45 g of NMP

EXAMPLE 3

25.46 g of BTDA (0.079 mol)
32.75 g of MEG (0,237 mol)
60.00 g of NMP/dioxane 1:1
0.05 g of DMAP
23.30 g of DADO (0,117 mol)
57.47 g of NMP/dioxane 1:1

EXAMPLE 4

25.46 g of BTDA (0,079 mol)
32.75 g of MEG (0,237 mol)
40.00 g of NMP
0.05 g of DMAP
23.30 g of DADO (0.117 mol)
30.00 g of NMP
31.09 g of Solvesso 100

EXAMPLE 5

21.83 g of PMDA (0.1 mol)
45.66 g of MPG (0.3 mol)
30.00 g of NMP/butyrolactone 1:1
0.05 g of DMAP
10.80 g of p-PDA (0.1 mol)
17.82 g of NMP/butyrolactone 1:1

EXAMPLE 6

32.23 g of BTDA (0.1 mol)
45.66 g of MPG (0.3 mol)
30.00 g of NMP/butyrolactone 1:1
0.50 g of DMAP
10.80 g of p-PDA (0.1 mol)
28.25 g of NMP/butyrolactone

EXAMPLE 7

31.03 g of ODPA (0.1 mol)
32.40 g of BZA (0.3 mol)
40.00 g of DMAC
0.05 g of DMAP
41.01 g of BAPP (0.1 mol)
42.83 g of NMP

EXAMPLE 8

31.03 g of ODPA (0.1 mol)
45.66 g of MPG (0.3 mol)
30.00 g of NMP
0.50 g of DMAP
5.40 g of p-PDA (0.05 mol)
5.40 g of m-PDA (0.05 mol)
5.40 g of m-PDA (0.05 mol)
16.64 g of NMP

COMPARATIVE EXAMPLES 1 AND 2

Tetracarboxylic diester, solvent and divine were mixed and stirred until a solution had formed.
Starting Materials

COMPARATIVE EXAMPLE 1

(In Accordance with U.S. Pat. No. 3,347,808)

32.50 g of BTDA diethyl ester (0.079 mol)
76.00 g of dioxane/NMP 1:1
23.30 g of DADO (0.117 mol) in 54.00 g of dioxane/NMP.

COMPARATIVE EXAMPLE 2

(In Accordance with U.S. Pat. No. 3,347,808)

32.50 g of BTDA diethyl ester (0.079 mol)
64.7 g of acetone
16.30 g of DADO (0,117 mol) in
67.50 g of cresol.

COMPARATIVE EXAMPLES 3 TO 7

The tetracarboxylic dianhydride was first refluxed with methanol for 2 h. After cooling, the diamine was added and the mixture was stirred until a solution had formed.
Starting Materials

COMPARATIVE EXAMPLE 3

(In Accordance with U.S. Pat. No. 4,874,835)

| | |
|---|---|
| 33.48 g of ODPA | (0.1079 mol) |
| 47.00 g of methanol | (1.4700 mol) |
| 3.891 g of p-PDA | (0.03598 mol) |
| 3.891 g of m-PDA | (0.03598 mol) |
| 7.205 g of DADO | (0.03598 mol) |

COMPARATIVE EXAMPLE 4

(In Accordance with U.S. Pat. No. 4,874,835)

| | |
|---|---|
| 32.26 g of ODPA | (0.1040 mol) |
| 43.00 g of methanol | (1.3400 mol) |
| 5.623 g of p-PDA | (0.052 mol) |
| 5.623 g of m-PDA | (0.0.52 mol) |

COMPARATIVE EXAMPLE 5

(In Accordance with U.S. Pat. No. 4,960,824)

| | |
|---|---|
| 52.00 g of BAPP-DA | (0.10 mol) |
| 62.80 g of methanol | (1.96 mol) |
| boil for 120 min, addition of | |
| 10.8 g of p-PDA | (0.1 mol) |

COMPARATIVE EXAMPLE 6

(In Accordance with U.S. Pat. No. 4,960,824)

| | |
|---|---|
| 21.80 g of PMDA | (0.10 mol) |
| 32.00 g of methanol | (1.02 mol) |
| 10.80 g of p-PDA | (0.10 mol) |

COMPARATIVE EXAMPLE 7

(In Accordance with U.S. Pat. No. 4,960,824)

| | |
|---|---|
| 32.23 g of BTDA | (0.10 mol) |
| 2.88 g of methanol | (1.34 mol) |
| 10.80 g of p-PDA | (0.10 mol) |

Testing of film forming properties of the solutions

The solutions were applied with a draw bar having a wedge-shaped slot to degreased steel panels. The coatings were heated at a rate of 5° C./min to 350° C. in a program controlled oven and maintained at 350° C. for 30 min.

The coatings developed blisters above a certain coating thickness. The table indicates the coating thickness $d_{max}$ up to which no blisters were observed.

Furthermore, the appearance, in particular the planarity of the films in the blister-free areas, was compared and the elastic behavior of the films was assessed by bending the panels across a sharp edge (Table).

| | Anhydride | Alcohol | Diamine | Molar ratio | Solvent | $d_{max}$ [μm] | Planarity | Bending test |
|---|---|---|---|---|---|---|---|---|
| E1 | ODPA | MEG | DADO | 1:1 | NMP | 60 | smooth | breaks |
| E2 | BTDA | MPG | DADO | 1:1 | NMP | >300 | smooth | elastic |
| E3 | BTDA | MEG | DADO | 0.79:1.17 | NMP/dioxane | 130 | smooth | elastic |
| E4 | BTDA | MEG | DADO | 0.79:1.17 | NMP/S 100 | 210 | smooth | elastic |
| E5 | PMDA | MPG | p-PDA | 1:1 | NMP/BLAC | 60 | smooth | breaks |
| E6 | BTDA | MPG | p-PDA | 1:1 | NMP/BLAC | >155 | smooth | elastic |
| E7 | ODPA | BZA | BAPP | 1:1 | DMAC | >300 | smooth | elastic |
| E8 | ODPA | MPG | m-PDA/p-PDA | 1:1 | NMP | 115 | smooth | breaks |
| CE1 | BTDA | E | DADO | 0.79:1.17 | NMP/dioxane | 12 | uneven (craters) | breaks |
| CE2 | BTDA | E | DADO | 0.79:1.17 | Acetone/cresol | 10 | uneven (craters) | breaks |
| CE3 | ODPA | M | m-PDA/p-PDA/DADO | 1:1 | Methanol | 17 | smooth | elastic |
| CE4 | ODPA | M | m-PDA/p-PDA | 1:1 | Methanol | — | uneven crumbly | — |
| CE5 | BAPP-DA | M | p-PDA | 1:1 | Methanol | 14 | smooth | elastic |
| CE6 | PMDA | M | p-PDA | 1:1 | Methanol | — | crumbly | — |
| CE7 | BTDA | M | p-PDA | 1:1 | Methanol | — | crumbly | — |

We claim:

1. A solution of polyimide-forming starting materials, comprising at least one aromatic or partly aromatic diamine containing at least one aromatic group and at least one aromatic or partly aromatic tetracarboxylic diester containing at least one aromatic ring, wherein at least 2 mol % of the ester groups in the tetracarboxylic diester are derived from alcohols of the general formula

HO—Z—O—X         I or

HO—Z——X         II where Z is a straight-chain or branched aliphatic radical of from 1 to 15 carbon atoms which can be interrupted by from 1 to 4 ether groups —O— and X is an aromatic radical of from 5 to 20 carbon atoms which can also contain nitrogen, oxygen, or sulfur as hereto atoms in the aromatic ring system, excepting a solution comprising both benzyl alcohol and at least one aromatic or partly aromatic diamine containing at least one aromatic group and having a basicity constant of less than or equal to $10^{-11}$.

2. A polyamide-coated article which article has been coated with the solution claimed in claim 1 and hardened.

3. A solution as claimed in claim 1, wherein at least 10 mol % of the ester groups in the tetracarboxylic diester are derived from alcohols of the general formula I or II.

4. A solution as claimed in claim 1, wherein the molar ratio of tetracarboxylic diester to diamine is from 1.5:1 to 1:1.5.

5. A solution as claimed in claim 1, wherein the solids content of said solution is from 30 to 60% by weight.

6. A solution as claimed in claim 1, excepting a solution comprising an aromatic or partly aromatic diamine containing at least one aromatic group and having a basicity constant of less than or equal to $10^{-11}$ and a tetracarboxylic diester derived from benzyl alcohol.

7. A solution as claimed in claim 6, wherein at least 10 mol % of the ester groups in the tetracarboxylic diester are derived from alcohols of the general formula I or II.

8. A solution as claimed in claim 6, wherein the molar ratio of tetracarboxylic diester to diamine is from 1.5:1 to 1:1.5.

9. A solution as claimed in claim 6, wherein the solids content of said solution is from 30 to 60% by weight.

10. A polyamide-coated article which article has been coated with the solution claimed in claim 6 and hardened.

* * * * *